Sept. 17, 1935.  H. SCHWARZE  2,014,592

LIGHTING SYSTEM FOR MOTOR VEHICLES

Filed Sept. 26, 1934  3 Sheets-Sheet 1

Inventor
Herman Schwarze, Deceased
By Bruce H. Schwarze, Adm'r
By Blackmore, Spence & Flint
Attorneys Sept. 17, 1935. H. SCHWARZE 2,014,592
LIGHTING SYSTEM FOR MOTOR VEHICLES
Filed Sept. 26, 1934   3 Sheets-Sheet 2
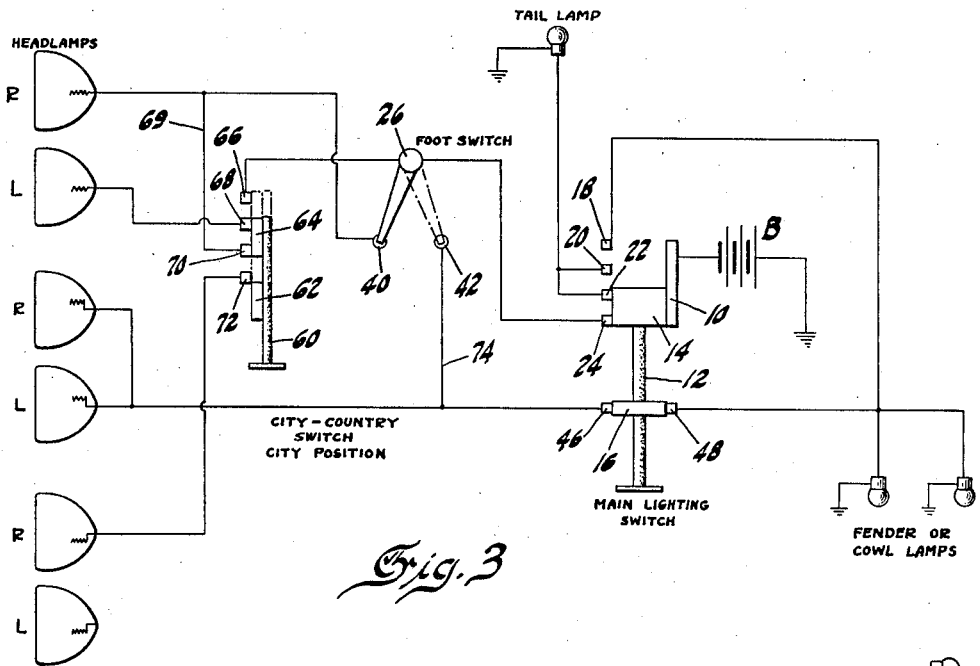
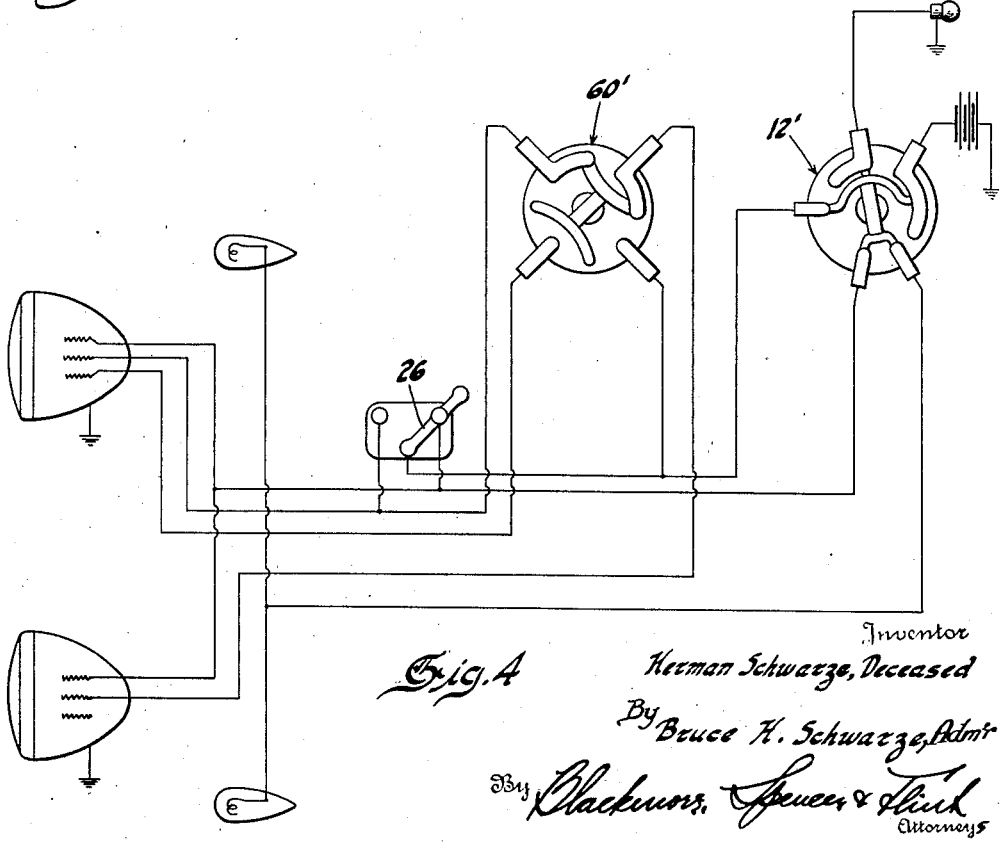

Sept. 17, 1935.  H. SCHWARZE  2,014,592
LIGHTING SYSTEM FOR MOTOR VEHICLES
Filed Sept. 26, 1934  3 Sheets-Sheet 3
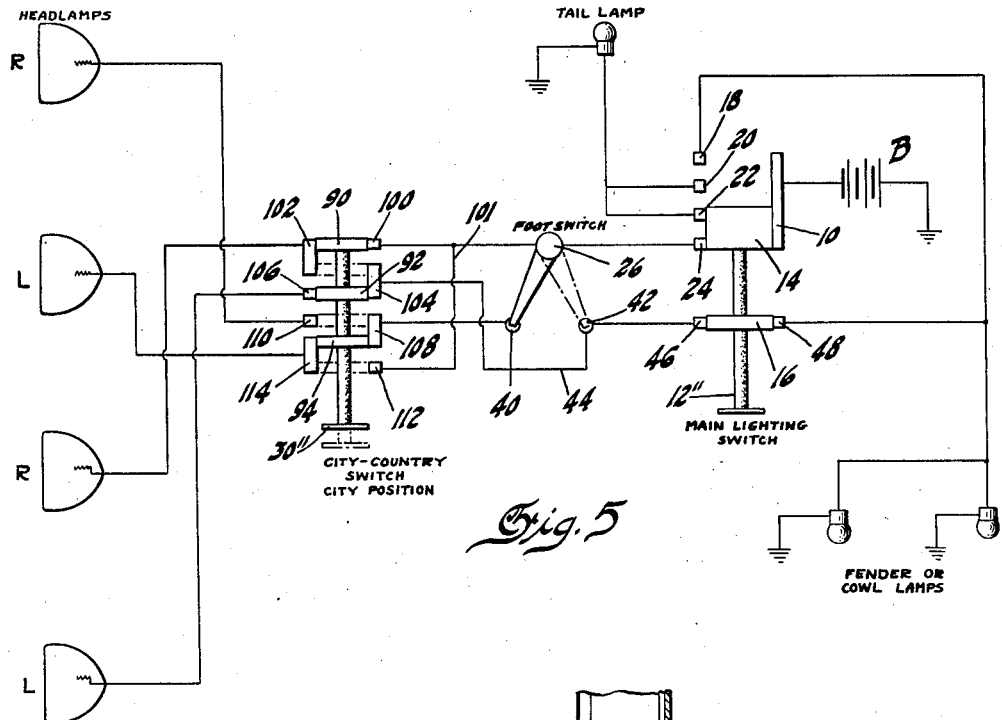
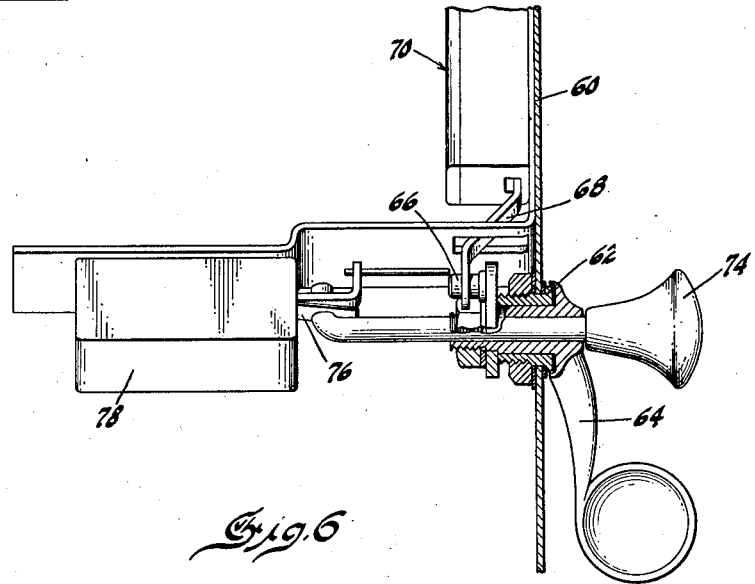

Patented Sept. 17, 1935

2,014,592

UNITED STATES PATENT OFFICE 2,014,592

LIGHTING SYSTEM FOR MOTOR VEHICLES

Herman Schwarze, deceased, late of Pontiac, Mich., by Bruce H. Schwarze, administrator, Birmingham, Mich., assignor to General Motors Corporation, Detroit, Mich., a corporation of Delaware Application September 26, 1934, Serial No. 745,537

7 Claims. (Cl. 171—97)

This invention has to do with a lighting circuit for automobiles equipped with means for providing more than two arrangements of beams. The invention is characterized by the provision of a plurality of switches arranged in series, each of which conditions the action of the others. In the preferred arrangement a main lighting switch is provided which, in addition to controlling the usual tail light and parking lights, closes the main headlighting circuit. A second switch is provided which may occupy either a city driving position or a country driving position. The circuit includes in addition, a switch preferably operated by the foot of the driver which may be actuated in either position of the city-country switch to shift from one beam to another. With this arrangement four different beam combinations may be rendered available to the driver or if the lighting equipment is of such construction as to provide but three then these three may be so arranged that in either country or city driving position a choice of two different beams, a high beam and a low beam, is permitted.

By employing simply two position switches greater safety is obtained for there is little likelihood of leaving one of the switches in an intermediate position where the headlights are off. It is also much easier to move a switch to either in or out position than to adjust a switch of more complicated type to an intermediate position.

There is illustrated diagrammatically in Figure 1 the preferred form of circuit.

In Figure 2 there is shown the same circuit as applied to an automobile.

In Figure 3 there is shown another form of circuit, this showing likewise being simplified and diagrammatic.

In Figure 4 there is shown the same circuit as actually applied to an automobile.

Figure 5 is a diagrammatic circuit of a modification of Figure 1.

Figure 6 shows a switch assembly combining two of the switches used in the systems here disclosed.

Figure 1:
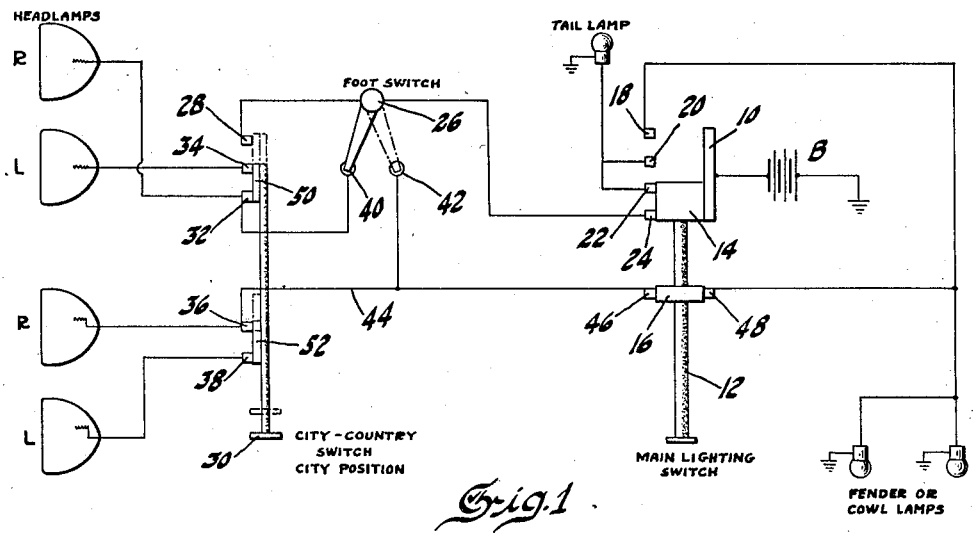

In the diagrammatic views shown in Figures 1, 3 and 5 the ground connections at the lamps have been omitted, it being understood that such connections are always provided. The headlamps which are customarily provided with two filament bulbs having one source on focus and one source above focus are represented for convenience in illustration in the form of two pairs of right and left headlamps with each lamp equipped with a filament either on focus or above as indicated.

The battery B grounded on one side as usual is shown supplying current to switch contact 10. The movable member 12 of the switch consists of a plunger of insulating material carrying switch members 14 and 16 insulated from each other. The switch member 14 may supply current through contact 18 to the fender or cowl lamps and through contact 20 to the tail lamp but in the position shown, current is supplied to the tail lamp through contact 22 and is supplied through contact 24 to the pivotal member 26 of the foot switch. Through the same contact current is supplied also to the contact 28 of the city and country switch 30. The switch 30 is provided with four other fixed contacts, of which 32 supplies current to the focal filament of the right headlamp, 34 supplies current to the focal filament of the left headlamp; 36 supplies current to the upper filament of the right headlamp; 38 supplies current to the upper filament of the left headlamp. Switch 30 is likewise supplied with two contacts 50 and 52 carried by a shiftable plunger of insulating material. The foot switch is provided with two fixed contacts, contact 40 being connected to contact 32 and contact 42 being connected to conductor 44 which connects contact 36 with contact 46 of the main lighting switch. In the position shown member 16 of the main lighting switch bridges contacts 46 and 48, the latter being connected to the fender or cowl lamps.

The described lighting circuit is especially designed for use with the headlighting system described and claimed in Patent No. 1,987,697, granted to Michel and Mead on January 15, 1935. According to that system, when the upper filaments of the headlamps are lighting a symmetrical low beam is obtained; when the focal filaments of both headlamps are lighting a symmetrical high beam is obtained, and when the focal filament of the left headlamp and the upper filament of the right headlamp are energized an asymmetrical beam is obtained lower on the left than on the right. The left side of the beam is dropped instead of the right side because the lamps are designed so that the tops of the beam cross each other. Obviously, if each beam were to be directed wholly to its own side of the road, a slight rearrangement of wiring would be necessary to produce the same beam combinations.

The lighting system just described may be used to secure any desired choice among the three beams. The arrangement illustrated in Figure 1 is preferred. Here with the three switches in the position shown in full lines, current is supplied from battery B through contacts 10, 14, and 24 to the movable member 26 of the foot switch, and through switch contact 40 and contact 32 to the focal filament of the right headlamp. Current is also supplied from contact 32 through movable contact 50 of switch 30 and contact 34 to the focal filament of the left headlamp. This produces a high beam.

When the foot switch is moved to the dotted line position, the supply of current to the focal filaments is cut off and current is supplied from the movable member 26 of the foot switch through contact 42, lead 44 and contact 36 to the upper filament of the right headlamp. Current is also supplied from contact 36 through movable contact member 52 of switch 30 and contact 38 to the upper filament of the left headlamp. The energization of both upper filaments produces a low beam. At the same time current is supplied through conductor 44, contact 46, movable contact 16 and contact 48 to the fender or cowl lamps. The lighting of these lamps indicates to the driver of the car that his beam is depressed.

With city-country switch 30 in dotted line position and the other switches in full line position the following circuits are closed. Current is supplied from contact 24 of the main switch to contact 28 of the switch 30, movable contact 50, and contact 34 to the focal filament of the left headlamp. Current is likewise supplied through contact 24 movable switch member 26, contact 40 and contact 32 to the focal filament of the right headlamp. Energization of the two focal filaments produces the high beam.

With both switch 30 and the foot switch in dotted line positions, the following circuits are closed. Current is, of course, supplied to the focal filament of the left headlamp the same as before. Current is also supplied from contact 24 through movable switch member 26, contact 42, lead 44 and contact 36 to the upper filament of the right headlamp. At the same time lead 44 supplies current to the fender lamps. The combination of the upper filament of the right headlamp and the focal filament of the left headlamp produces an asymmetric beam lower on the left side than on the right as previously explained.

Figure 2:
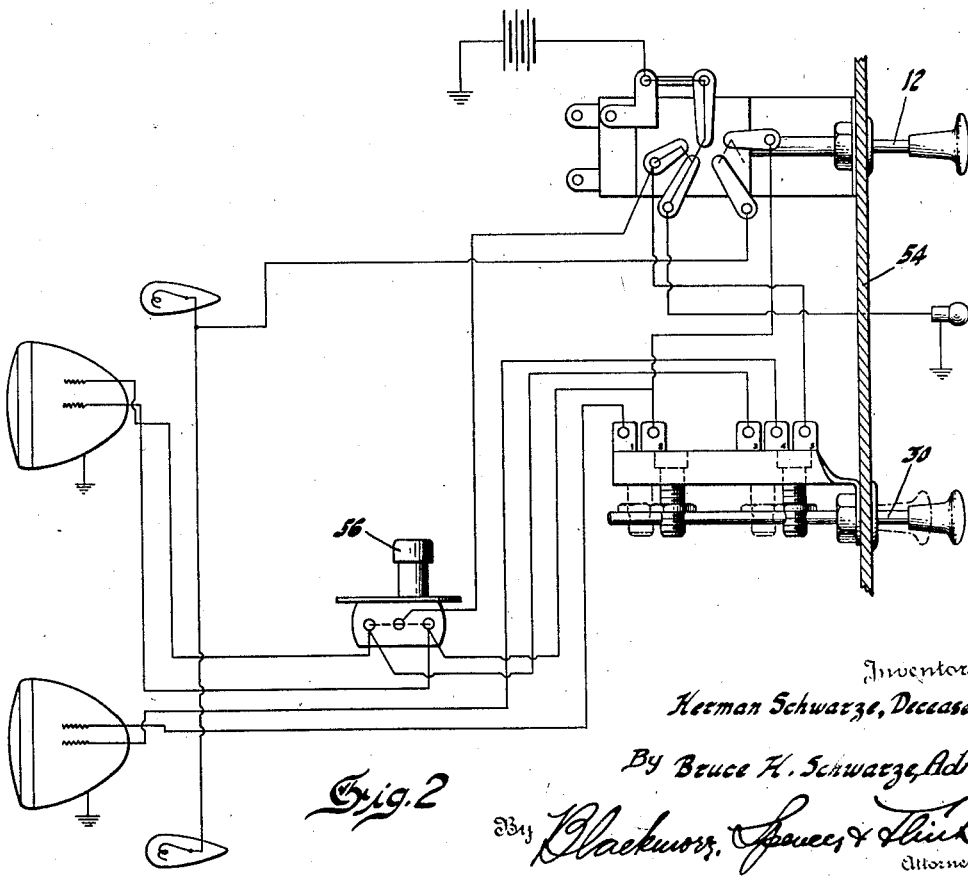

In Figure 2 there is shown a circuit as having the same operating characteristics as the circuit of Figure 1. The circuit is illustrated more conventionally as applied to an automobile. The main lighting switch 12 and the city-country switch 30 are indicated as mounted on the instrument panel 54 and the foot switch shown at 56 is illustrated as of the plunger actuated type. This circuit and the switches used in it are identical in operation with the arrangement shown in Figure 1, and consequently will not be described.

In Figure 3 there is shown a lighting circuit embodying much the same principles of design applied to headlamps equipped with three filament bulbs but in which no use is made of the lowermost filament of the left headlamp. For convenience of illustration the headlamps are shown as three pairs of right and left lamps, the first pair having focal filaments, the second pair filaments above focus, and the third pair filaments below focus. The main lighting switch 12 functions in the same manner as before described. The foot switch is likewise similarly arranged so that like reference characters have been used for these parts. The city-country switch 60 is provided with movable contact members 62 and 64, carried by an insulating plunger, but with only four fixed contacts. Contact 66 is connected to contact 24. Contact 68 is connected to the focal filament of the left headlamp. Contact 70 is connected to the focal filament of the right headlamp and to the contact 40 of the foot switch. Contact 72 is connected to the below focus filament of the right headlamp. The above-focus filaments are connected to each other and through conductor 74 to the contact 42 of the foot switch and contact 46 of the main switch.

The combinations of beams obtained with the modified circuit are substantially the same as those with the first form. By tracing the circuit through it will be found that with the switch 60 in full line or city position and the foot switch in full line position the focal filaments will be energized producing a high beam. With the same arrangement but with the foot switch in dotted line position the above-focus filaments will be energized producing a low beam and with them the side lights will be lighted.

With the switch 60 in country position, shown in dotted lines, and the foot switch in full line position the focal filaments will be energized, producing a high beam and the lower filament of the right lamp will be energized by current flowing through contact 40, lead 69, contact 70, movable contact 62 and contact 72, producing a supplemental beam having its top considerably above the usual cutoff. This will give good illumination for high speed driving in the absence of traffic.

If the foot switch is now moved to dotted line position the supply of current to the focal filament and the below-focus filament of the right lamp will be cut off and the upper filaments of both lamps will be energized together with the focal filament of the left headlamp, producing a beam higher on the right side than on the left.

This circuit was especially designed for use with the lighting system disclosed and claimed in Patent No. 1,929,111, granted to Falge and Godley on October 3, 1933.

In Figure 4 there is shown a wiring diagram identical in function with that of Figure 3. The illustration is more conventional in that the filaments are shown grouped in the lamps, and the reciprocating switches shown at 12 and 60 are replaced by switches 12' and 60' of rotary type. The operation of the circuit is identical with that of Figure 3.

In all of these arrangements the main lighting switch may be provided with positions in which the tail light alone may be put on, or the tail light and side lights may be put on together as shown.

While such operation is not intended, nor will it be found as convenient, nevertheless, if desired, in some positions of the foot switch a change in beams may be obtained by shifting the city-country switch.

The circuit shown in Figure 5 is much the same as that shown in Figure 1 except for the provision for a different selection of beams made possible by modification of the city-country switch.

With the circuit as shown in full lines in Figure 5, switch 30″ being in city position, current is supplied to the upper filament of the right headlamp from battery B through contact 10, 70, switch element 14, contact 24, contact 100 of switch 30″, switch element 90 and contact 102. Current is supplied to the focal filament of the left headlamp from battery fed contact 24, foot switch 26, switch contact 40, contact 108, switch contact 94 and contact 114. The upper filament of the right lamp together with the focal filament of the left lamp give an asymmetrical beam higher on the right side than on the left.

Upon now moving the foot switch to the dotted line position the current supply to the focal filament of the left headlamp is interrupted and current is supplied to the upper filament of the left headlamp from the foot switch 26 through contact 42, lead 44, contact 104, switch contact 92 and contact 106. With the two upper filaments energized a low beam is obtained, and this is accompanied by lighting of the fender lamps through current supplied from foot switch contact 42, and contacts 46, 16 and 48 of switch 12.

The following beam combinations are obtained by moving the switch 30'' to dotted line or country position. With the foot switch in full line position current is supplied to the focal filament of the left headlamp from the battery fed contact 24, lead 101, contact 112, switch contact 94, and contact 114. Current is also supplied to the focal filament of the right headlamp from the foot switch through contact 40, contact 108, switch contact 92 and contact 110. With the two focal filaments energized, a high beam is obtained.

Upon now moving the foot switch to the dotted line position the current supplied to the focal filament of the right headlamp is interrupted and current is supplied to the upper filament of the right headlamp from the contact 42 of the foot switch, through lead 44, contact 104, switch contact 90 and contact 102. With the focal filament of the left headlamp and the upper filament of the right headlamp energized an asymmetrical beam is obtained higher on the right side than on the left, and this is accompanied by lighting of the fender lamps through the circuit previously described.

With this circuit it will be apparent that in each setting of the city or country switch 30'' the fender lamps come on with the lower of the two beams obtainable by manipulating the foot switch, and so indicate to the driver that he has depressed the beam.

In Figure 6 there is illustrated a combined mounting for two of the three switches of the systems here disclosed, the two preferably being the main lighting switch and the city-country switch. 62 indicates a guide suitably secured in an aperture in a support such as the usual instrument board 60. 64 indicates a switch lever having its hub journaled in the bushing. To the other end of the hub is secured a crank arm having a pin 66 thereon loosely connected with sliding contact member 68 of switch 70. Within the hub of the lever 64 is slidably mounted rod 74 arranged to actuate sliding contact member 76 of switch 78. Each of the switches 70 and 78 is preferably designed as a two position switch and one may be wired to serve as the control switch while the other serves as the main lighting switch or vice versa as desired.

To avoid unnecessary limitation of the scope of the patent protection the foot switch is referred to in the claims as a "selector switch" and the city-country switch is referred to as a "control switch."

It will be understood that the circuits here disclosed may be arranged to provide other combinations of beams than are here described, this involving merely a shifting about of the connections to the lamps or the employment of headlamps of different optical design and all such changes clearly come with the scope of this invention.

What is claimed is:

1. The combination with light projecting means for automobiles adapted to project at least three combinations of beams, of a circuit for supplying current to said light projecting means including a main lighting switch controlling flow of current thereto, a control switch adapted in one position to permit energization of the light projecting means to produce either of a pair of said beam combinations, and in another position to permit energization of the light projecting means to produce either of another pair of said beam combinations, and a selector switch operative in either position of adjustment of said control switch to permit selection of the desired beam combination of the pair, each of said last named switches having two positions only.

2. The combination with light projecting means for automobiles adapted to project at least three combinations of beams, of a circuit for supplying current to said light projecting means including a main lighting switch controlling flow of current thereto, a control switch adapted in one position to permit energization of the light projecting means to produce either of a pair of said beam combinations, and in another position to permit energization of the light projecting means to produce either of another pair of said beam combinations, and a selector switch operative in either position of adjustment of said control switch to permit selection of the desired beam combination of the pair said last named switches having two positions only, and auxiliary lighting means arranged to be energized in one position of adjustment of said selector switch.

3. The combination with light projecting means for automobiles adapted to project at least three combinations of beams, of a circuit for supplying current to said light projecting means including a main lighting switch controlling flow of current thereto, a control switch adapted in one position to permit energization of the light projecting means to produce either of a pair of said beam combinations, and in another position to permit energization of the light projecting means to produce either of another pair of said beam combinations, and a selector switch operative in either position of adjustment of said control switch to permit selection of the desired beam combination of the pair said last named switches having two positions only, said switches being arranged in series.

4. The combination with light projecting means for automobiles adapted to project at least three combinations of beams, of a circuit for supplying current to said light projecting means including a main lighting switch controlling flow of current thereto, a control switch adapted in one position to permit energization of the light projecting means to produce either of a pair of said beam combinations, and in another position to permit energization of the light projecting means to produce either of another pair of said beam combinations, and a selector switch operative in either position of adjustment of said control switch to permit selection of the desired beam combination of the pair, said switches being arranged in series, and auxiliary lighting means arranged to be energized in one position of adjustment of said selector switch, said auxiliary lighting means being adapted to indicate the beam in use.

5. An automobile lighting circuit including the combination with right and left headlamps having high beam and low beam circuits, a dimming switch including output terminals adapted for connection alternatively to energize the high beam or the low beam circuit of at least one of said headlamps, a control switch for controlling the operation of the headlamps and including contacts and circuit connections for determining the headlamps upon which the dimming switch is effective, each of said switches having two positions only and a main lighting switch controlling the flow of current to said switches.

6. An automobile circuit including the combination with headlamps each adapted to project either a high beam or a low beam, of a selector switch, a control switch including contacts and circuit connections adapted in one setting to energize directly the high beam of one headlamp, and indirectly through said selector switch to energize alternatively the high beam or the low beam adjustment of the other headlamp, said control switch being adapted in another position to indirectly energize through said selector switch alternatively the high beam or low beam adjustment of at least one of said headlamps, each of said switches having two positions only, and a main lighting switch controlling the flow of current to said switches.

7. An automobile circuit including the combination with headlamps each adapted to project either a high beam or a low beam, of a selector switch, a control switch including contacts and circuit connections adapted in one setting to energize directly the high beam of one headlamp, and indirectly through said selector switch to energize alternatively the high beam or the low beam adjustment of the other headlamp, said control switch being adapted in another position to indirectly energize through said selector switch alternatively the high beam or low beam adjustment of at least one of said headlamps, each of said switches having two positions only and a main lighting switch controlling the flow of current to said switches, and auxiliary lighting means provided with connections to be energized by said selector switch in one position of adjustment thereof, said auxiliary lighting means being adapted to indicate the beam in use.

BRUCE H. SCHWARZE,
*Administrator of the Estate of Herman Schwarze, Deceased.*